Feb. 8, 1955  A. J. EVERS  2,701,703
WEIGHING APPARATUS
Filed Oct. 19, 1949  4 Sheets-Sheet 1

INVENTOR.
ARTHUR J. EVERS
BY
James and Franklin
ATTORNEYS.

Feb. 8, 1955 — A. J. EVERS — 2,701,703
WEIGHING APPARATUS
Filed Oct. 19, 1949 — 4 Sheets-Sheet 2

INVENTOR.
ARTHUR J. EVERS
BY James and Franklin
ATTORNEYS.

Feb. 8, 1955 A. J. EVERS 2,701,703
WEIGHING APPARATUS
Filed Oct. 19, 1949 4 Sheets-Sheet 3

INVENTOR.
ARTHUR J. EVERS
BY
James and Franklin
ATTORNEYS.

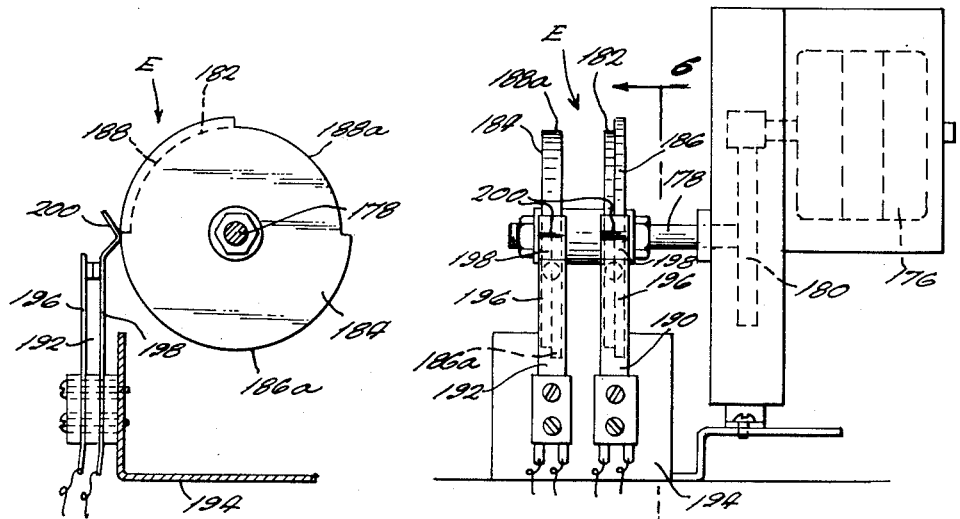
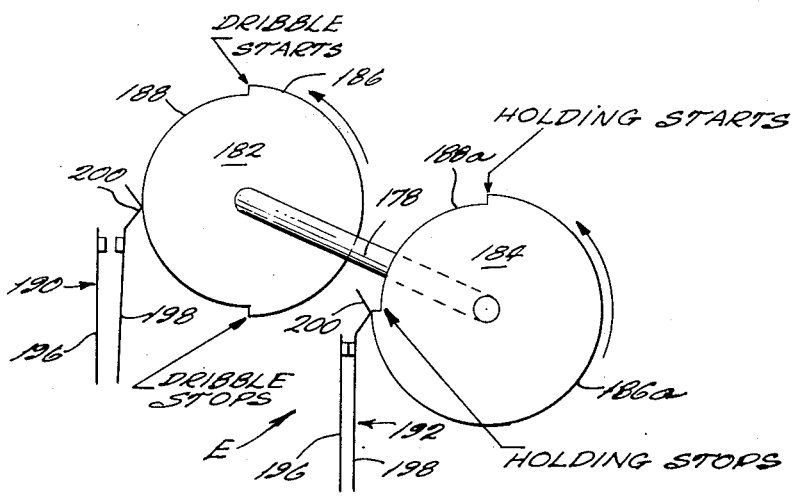

United States Patent Office 2,701,703
Patented Feb. 8, 1955

2,701,703

WEIGHING APPARATUS

Arthur J. Evers, Brooklyn, N. Y.

Application October 19, 1949, Serial No. 122,247

32 Claims. (Cl. 249—1)

The present invention relates to an apparatus for weighing material being fed into a tray or other container and for delivering a predetermined weight of said substance.

Many machines have in the past been devised for continuously feeding a substance into a tray or the like until the weight of the substance in that tray reaches a predetermined amount, the feed then stopping and the substance in the tray being delivered to a container. Since selling of less than the specified amount of material is fraught with serious consequences, sometimes even of a criminal nature, it is absolutely imperative that the amount of substance placed in the container be at least the predetermined amount. Accordingly, all such weighing and delivering machines are designed to err on the side of liberality, that is to say, they may deliver more but never less of the substance than said predetermined amount. It is naturally of prime economic importance that the weighing machine operate as accurately as possible in order to prevent waste of material. If a container is supposed to contain one pound and if one pound, one ounce is put into each container, every seventeenth container is, insofar as the manufacturer is concerned, a complete loss.

Many expedients have been proposed in the past to minimize the waste inherent in the feeding and weighing processes and to maximize the accuracy of the weighing equipment. One of these expedients is the employment of two types of feeding: a bulk feed, which causes the substance to pass into the weighing tray at a rapid rate, and a dribble feed, which causes the substance to pass into the weighing tray at a greatly reduced rate. Either the bulk feed alone, or the bulk and dribble feeds together, function until the weight of the substance in the tray approaches the predetermined weight, at which time the bulk feed ceases and dribble feed alone continues. In this way a somewhat finer control over the feed is achieved, the substance being fed into the tray at a slow rate during the critical period when the weight of the substance in the tray closely approaches and finally attains the predetermined amount.

Despite the widespread use of this expedient, certain inherent inaccuracies still remain which are a cause of constant loss to the merchandiser. As the amount of substance in the tray comes very close to the predetermined weight, the scale becomes exceedingly sensitive. Of necessity the substance being fed into the tray must fall thereinto from a substantial height and when it hits the tray it has an appreciable amount of kinetic energy or momentum which will, for a moment, cause the scale to sense a weight somewhat greater than the actual weight of the substance in the tray. Hence, the automatic weighing apparatus will act as though the predetermined weight has been reached and, consequently, will stop the feed altogether. Unless this effect is compensated for in some way, the result will be that the weighing machine will uniformly deliver less than the predetermined weight, an inadmissible mode of operation. When the substance in question is of uniform consistency, it is theoretically possible to make an adjustment to accommodate for this effect by slightly raising the weight to be sensed above the actual weight desired. This adjustment is at best a very delicate one, and it is from a practical point of view impossible to make it when the substance being fed is non-homogeneous, granular, or lumpy to the slightest degree. When lumps of various sizes are to fall onto the tray, a lump of large size will have a greater deranging effect than will a small lump, and since there is no way of knowing exactly what size lump will fall at the moment when the weight of material in the tray is just short of the predetermined amount, advance compensation cannot be made. Even if the momentum effect be adequately compensated for, so that the feed will be stopped exactly at the moment when the weight of the substance in the tray is the predetermined amount, there will always be some appreciable amount of substance in transit between the feeding means and the tray. This substance will fall upon the tray after the feeding means has been stopped and will, therefore, constitute an "overage" in excess of the predetermined weight. Here again it is theoretically possible, if the substance is homogeneous and is fed at an absolutely even rate, to compensate for this effect. But feeding at an absolutely even rate is, from a practical point of view, impossible even with fluids and especially with solids, and when non-homogeneous, granular, or lumpy substances are being fed, it is completely impossible to compensate for this source of error.

The apparatus of the present invention wholly eliminates these sources of error and thus permits the placing of exactly the predetermined amount of substance in the tray, no more and no less. To this end, the feeding and the weighing are intermittent and in timed relation one to the other, the feeding taking place when the weighing is not taking place and vice versa. In order to take into account the substance in transit from the feeding means to the tray, the weighing is preferably delayed an appropriate interval after the feeding has stopped. If the weighing indicates that the predetermined weight has not yet been reached, the feeding is resumed for a short time, the tray and its contents are again, after an interval, weighed, and so on. Obviously, the maximum error in weight when such a method is employed is determined by the amount of substance which is fed during each feeding period. It is also obviously desirable that the tray should come up to predetermined weight as quickly as possible in order that a maximum number of containers per unit time can be filled by the apparatus. In order to realize both of these advantages, it has been found feasible, and indeed desirable, to cause the feeding-weighing cycle to take place several times a second, thus making each feeding period short so as to minimize the amount of substance fed during that period.

When relatively large amounts of substance are to be weighed in each sequence, it has been found desirable to employ the bulk and dribble feeds of conventional apparatus. The bulk feed, and the dribble feed if desired, may be actuated continuously until the amount of substance in the tray approaches the predetermined amount. Then the bulk feed is cut off and only the dribble feed is employed in the intermittent feeding-weighing cycle just described.

The above advantages can be attained provided the weighing function of the scale is restrained during the feeding periods and preferably for a predetermined interval thereafter. By the term "restraining the weighing function" is meant preventing the scale from indicating in any effective way the weight which it senses. Thus, if the scale is to indicate that the predetermined weight has been reached by closing an electric circuit, which circuit controls subsequent functions of the apparatus, maintaining the circuit in open condition during the feeding will effectively prevent the scale from indicating the weight which it senses and hence will "restrain its weighing function." However, the impact of the substance on the tray, that is to say, the effect of its kinetic energy or its momentum giving rise to an apparent weight which immediately disappears as soon as the substance has come to rest, will tend to cause an oscillation in the scale which will in turn give rise to inaccurate readings even after the feeding has stopped. To utilize any effective damping mechanism would be to decrease the inherent accuracy of the scale. Accordingly, it has been found quite advantageous to restrain the weighing mechanism of the scale by holding the moving parts, and in particular its weighing beam, stationary during the time that feeding is taking place and for such a predetermined interval after feeding has stopped that all of the substance in transit from the feeding means to the tray will have reached the tray and become stationary. Then when the weighing beam is released, the scale will accurately indicate the weight of the contents thereof. In order to obtain the effects of this advantage throughout the weighing sequence, the weighing mechanism is preferably so constructed that the moving parts thereof are stationary until the weight of the substance in the tray is very close to the predetermined weight which is to be ultimately delivered.

The apparatus of the present invention is specifically designed to operate in the manner above described in a simple and effective manner. The scale is defined by a pair of weighing beams, one of which controls the action of the bulk feed and initiates the intermittent feeding-weighing cycle after the weight of the substance approached the predetermined amount, and the other of which is effective, by means of suitable controls, to stop the feeding and to cause the tray to deliver its contents to a container or the like when the predetermined amount has been reached. As a particularly advantageous feature, the mechanism which restrains the weighing function is active on the weighing beam in a uniform manner so that no inaccuracy in the weighing function will be caused thereby.

To the accomplishment of the foregoing advantages and such other objects as may hereinafter appear, the present invention relates to an apparatus for weighing a substance, the feeding of the substance being so related in point of time to the weighing thereof that an accurately predetermined weight of said substance is delivered during each sequence. The inventive features of the method and apparatus are defined in the appended claims and are described in this specification, taken together with the accompanying drawings, in which—

Fig. 5 is a side view of the timer employed in the apparatus;

Fig. 6 is an end view thereof; and

Fig. 7 is a perspective schematic view illustrating the timed relationship between the various functions.

Figure 1:
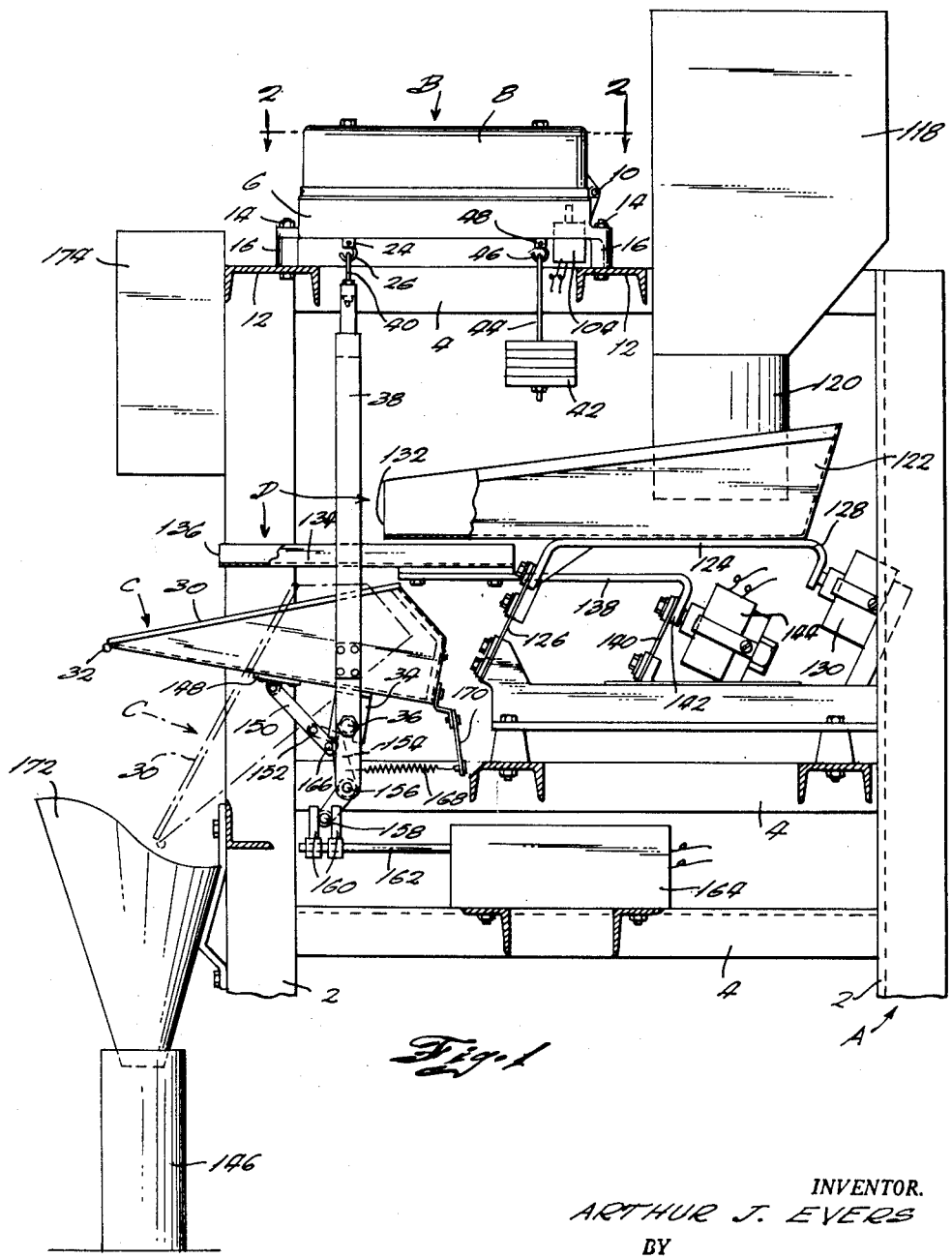
Fig. 1 is a side view, partially in cross-section, of one embodiment of the apparatus of the present invention.

The essential elements of the method have already been disclosed. The details of the disclosed apparatus will now be set forth, and its mode of operation will then be described.

The apparatus, broadly viewed, comprises a frame generally designated A on which a scale or other weighing device B is mounted, a tray C being suspended from the scale B so as to be weighed thereby. Feeding means generally designated D are provided for feeding a substance into the tray C, the feeding means D being intermittently actuated during at least a part of the weighing operation, this intermittent actuation being brought about by means of a timer E also mounted on the frame A and operatively connected to the feeding means D. A restraining means F forms a part of the apparatus, the restraining means being intermittently actuated by the timer E and, when actuated, being active upon the scale B to restrain its weighing function.

The frame A comprises a plurality of upright supports 2 and lateral supports 4 and 12 interconnected so as to define a self-sustaining structure. As here disclosed, the scale B is enclosed within a housing 6 having a cover 8 hinged thereto at 10, the housing being secured to horizontal supports 12 by means of studs 14 passing through sleeves 16. As may best be seen by reference to Figs. 2 and 3, the scale itself comprises a first weighing beam 18 pivotally mounted between the upstanding brackets 20 secured to the bottom wall 22 of the housing 6, a bracket 24 being pivotally secured near one end of the beam 18, that bracket terminating in a hook 26 passing through an aperture 28 in the bottom wall 22. The tray C, which has an open top 30 and a dispensing lip 32, is provided with depending brackets 34 which are pivotally mounted about studs 36 received in the lower end of the framework 38, the upper end of the framework being freely dependent from the hook 26, secured thereto by means of eye 40. Hence, the weight of the tray and the substance therein would tend to cause the first beam 18 to pivot in a counterclockwise direction as shown in Fig. 3. A counterbalancing weight 42 is suspended from beam 18 on the opposite side of the pivot therefor, that weight being mounted on rod 44 which is hung from hook 46 attached to rod 48 which passes through aperture 50 in the bottom wall 22 of the housing 6 and which is secured to bracket 52 on the first beam 18. In order to prevent the beam 18 from pivoting too far in a counterclockwise direction, a positive stop 54 is provided on the bottom wall 22 of the housing 6, cooperable with an adjustable screw 55 depending from the first beam 18. Secured to each end of the first beam 18 are horizontal arms 56 between which extend rod 58 and the rotatable screw 60. A weight 62 has a longitudinal orifice 64 therein through which the rod 58 is slidably received and a portion 66 adapted to overlie and make threaded engagement with the screw 60. A knurled fingerpiece 68 is secured to the screw 60 for rotating the same. It will be apparent that when the knurled knob 68 is rotated, the weight 62 will move from side to side as viewed in Fig. 2 and, hence, will act as an adjustable balancing weight, thus conditioning the apparatus for weighing different predetermined amounts.

The first beam 18 is provided near the end opposite that from which the scale C is suspended with an adjustable contact screw 70 depending therefrom, that screw being adapted to make electrical connection with fixed contact 72 mounted on the bottom wall 22. Suitable electrical connection is made with this contact screw 70 and with contact 72 so as to control bulk electronic relay 202. When, as here, the beam is itself of electrically conducting material, electrical connection to the screw 70 is made via the first beam 18 itself and the flexible conductive leaf 74 secured to the bottom wall 22 by means of bracket 76, the end of the leaf 74 engaging and, hence, making electrical connection with hub 78 of beam 18.

The second beam 80 is pivotally mounted between brackets 82 secured to the bottom wall 22 of the housing 6 and is provided with a sidewardly extending arm 84 adapted to extend under a sidewardly extending arm 86 secured to the first beam 18, a clearance existing between the pin 84 and the arm 86 except when the weight of the substance in the tray C causes the first beam 18 to pivot in a counterclockwise direction as viewed in Fig. 3. The other end of the second beam 80 is provided with an adjustable contact screw 88 depending therefrom, that screw being adapted to make electrical connection with fixed contact 89 secured to the bottom wall 22 and insulated therefrom. Suitable electrical connection is made with the contact screw 88 and contact 89 so as to control dribble electronic relay 220. A second adjustable balancing weight 91 is slidably mounted on the second beam 80, wing-nut 93 acting on screw 95 to fix the weight 91 in adjusted position.

Figure 2:
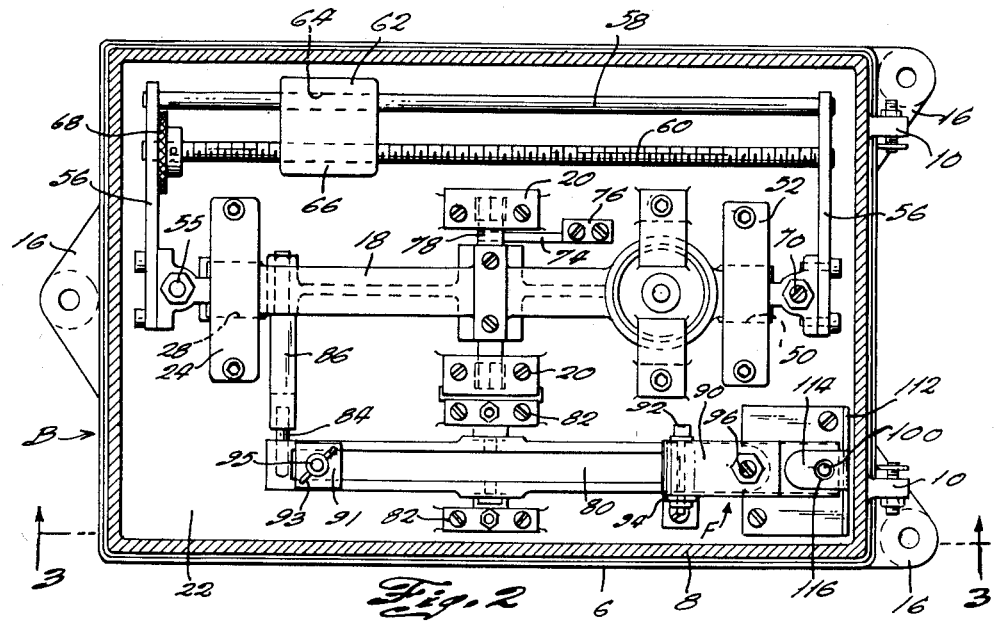
Fig. 2 is a top cross-sectional view taken along the line 2—2 of Fig. 1.
Figure 3:
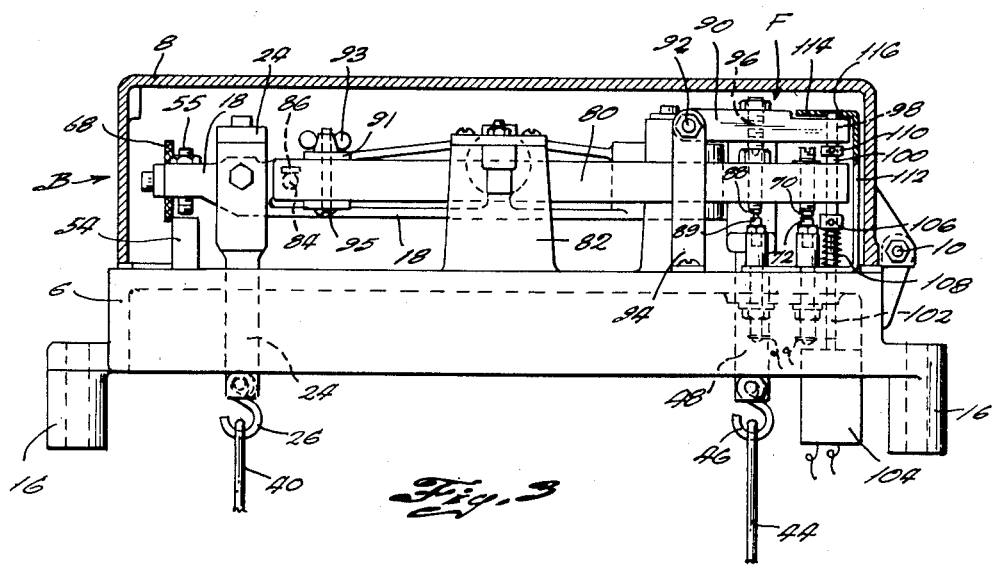
Fig. 3 is a side cross-sectional view taken along the line 3—3 of Fig. 2.

The restraining means F is here defined by a first member or element in the form of arm 90 pivotally mounted at 92 between the upstanding brackets 94 secured to the bottom wall 22, that member being provided with an adjustable screw 96 depending therefrom which is adapted, when the first member 90 is permitted to pivot under the influence of its own weight, to be active on the second beam 80, as by engaging the upper surface of the adjustable contact screw 88 carried thereby, so as always to urge that beam 80 to pivot in a clockwise direction as viewed in Fig. 2 and bring the contacts 88 and 89 into engagement. The end of the first member 90 is provided with an aperture 98 in which a second member in the form of rod 100 is vertically slidable, that rod being freely passable through the bottom wall 22 and having a lower end 102 in operative relation to solenoid 104. The rod 100 is provided with a lower collar 106, a spring 108 being active between that collar 106 and the bottom wall 22 of the housing 6 so as always to urge the rod 100 upwardly, and with an upper collar 110 adapted to engage the underside of the first member 90 and lift that member out of engagement with the second beam 80. A bracket 112 is secured to the bottom wall 22, that bracket having a horizontal lip 114 overlying the first member 90 and having an aperture 116 therein through which the rod 100 is freely passable. Whenever the solenoid 104 is not energized, the spring 108 will urge the rod 100 upwardly, the upper collar 110 thereon lifting the first member 90 into engagement with the horizontal lip 114 of the bracket 112, thus removing the pendulous weight of the first member 90 from the second beam 80 so as to permit it to perform its weighing function. Whenever the solenoid 104 is energized, it will draw the rod 100 downwardly, thus permitting the first member 90 to fall upon the second beam 80 and counterbalance it so as to retain it in its position pivoted clockwise as viewed in Fig. 3 with the contacts 88, 89 in engagement. It will be noted that whenever the solenoid 104 is energized, the pressure applied to the second beam 80 is independent of the force exerted by the solenoid 104, this being accomplished by the mode of connection between the rod 100 and the first member 90, that mode of connection featuring a lost motion connection.

The substance to be fed to the tray is placed in a hopper 118, this hopper having an outlet spout 120 leading into a bulk feed trough 122 mounted on bracket 124 which is secured to the frame A via bendable strip 126. The bracket 124 terminates in a downwardly bent lip 128 disposed adjacent electromagnet 130. The end 132 of the bulk feed trough 122 is open and is positioned above the open top 30 of the tray C. Whenever a pulsating electric current is applied to the electromagnet 130, the bracket 124 and, hence, the bulk feed trough 122 will be vibrated, thus causing the substance fed into the trough 122 from the hopper 118 to move therealong and drop out of the open end 132 into the tray C.

A narrow dribble feed trough 134 having an open end 136 also disposed above the open top 30 of the tray C is mounted below the bulk feed trough 122 on bracket 138 secured to the frame A by means of bendable strip 140 and having a downwardly bent lip 142 disposed close to electromagnet 144. Since the dribble feed trough 134 is considerably narrower than the open end 132 of the bulk feed trough 122, energization of the bulk feed will not only cause some of the substance to fall into the tray C, but will also cause some of the substance to fall into the dribble trough 134. Energization of the dribble feed will, through vibration, cause the substance in the trough 134 to move forwardly to the open end 136 thereof and to drop from there into the tray C.

Whenever the weight of the substance in the tray C reaches the predetermined amount, some mechanism is necessary for causing that tray to deliver its contents to an appropriate container 146. As here disclosed, the bottom of the tray C is provided with bracket 148 on which arm 150 is pivotally mounted, that arm in turn being pivotally mounted at 152 on an end of lever 154 pivotally mounted at 156 on the dangling extremity of the framework 38. The other end of the lever 154 is provided with stud 158 received between upstanding fingers 160 carried by slide rod 162 extending into solenoid 164. The end of arm 150 is provided with a protrusion 166 which engages with the lever 154 so as to limit pivotal motion of the arm 150. A spring 168 is connected between the lever 154 and an arm 170 depending from the tray C. When the linkage above described is in the position shown in Fig. 1, the tray C will assume the position shown in solid lines and, hence, as substance is fed thereinto, it will remain therein. When the solenoid 164 is energized, the lever 154 will pivot in a clockwise direction and thus will cause the tray C to assume its downwardly inclined position illustrated in broken lines in Fig. 1, in which position the contents of the tray will fall through funnel 172 secured to the frame A and into the container 146 positioned therebelow.

The timer E and electrical controls for the apparatus are preferably all mounted in a single housing 174 secured to the frame A. The timer E is shown in Figs. 4 to 7 and comprises a constant speed motor 176 which drives shaft 178 through an appropriate reduction gear assembly 180 so that it will rotate at any desired speed. Two timing cams 182 and 184 are mounted on the shaft 178 for rotation therewith, the peripheries of each of those cams having raised surfaces 186, 186a, respectively, and depressed surfaces 188, 188a, respectively. Leaf switches 190 and 192 are mounted on bracket 194, each of those switches comprising an outer stationary leaf contact 196 and an inner leaf contact 198 inherently resiliently urged toward the cams 182 and 184, respectively, so that the cam engaging portion 200 thereof will make contact with the surfaces 188, 188a, or 186, 186a, as the case may be. When the depressed surfaces 188, 188a are opposite the cam engaging portion 200, the contact leaves 196, 198 will separate and, hence, the circuit through them will be open (see left-hand switch of Fig. 7). When the cam engaging portion 200 is in contact with the raised surfaces 186, 186a of the cams 182 or 184, the inner leaf contact 198 will be urged toward the fixed outer leaf contact 196 so as to engage the same and close the circuit between them (see right-hand switch of Fig. 7). The cam surfaces of the cams 182 and 184 are so shaped, and the cams 182 and 184 are so angularly related one to the other on the shaft 178, that the proper timed relationship between feeding and weighing will take place.

Figure 4:
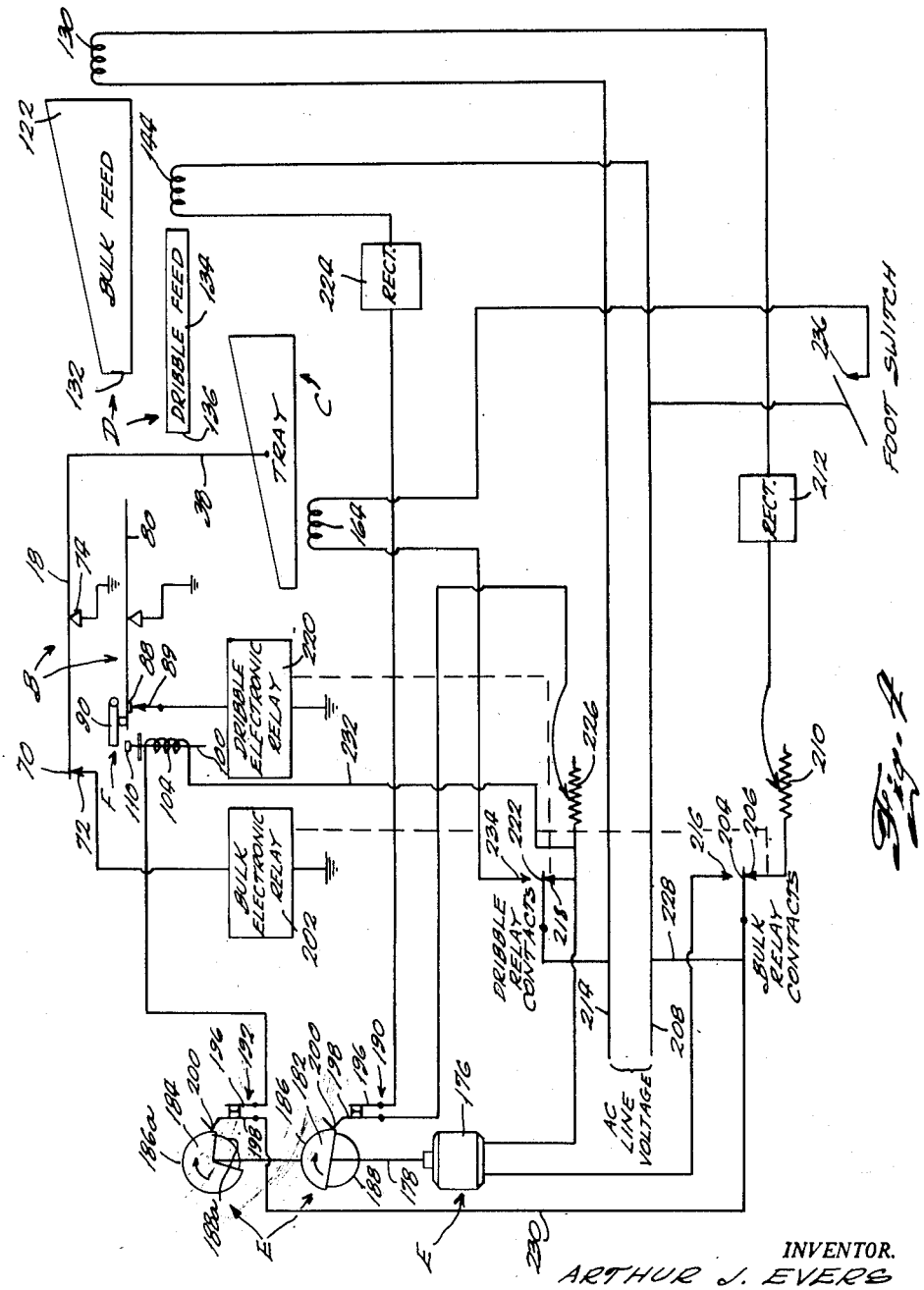
Fig. 4 is a schematic diagram illustrating the interrelationship between the various elements and the electric circuits interconnecting them.

The mode of operation of the apparatus here disclosed can best be explained by reference to Figs. 4 and 7. When the tray C is empty, the counterbalancing weight 42 and the adjustable balancing weight 62 will cause the first beam 18 to pivot in a clockwise direction as viewed in Fig. 3 until the contacts 70 and 72 engage, thus closing the circuit through the bulk electronic relay 202. This will cause the bulk electronic relay contact 204 to engage with contact 206, thus closing a circuit from one end of the line 208 through rheostat 210 and rectifier 212 to the electromagnet 130 and thence to the other side of the line 214. Since alternating current is applied across the line 208, 214, pulsating voltage will be applied to the electromagnet 130, thus causing the bulk feed trough 122 to vibrate and feed substance at a rapid rate into the tray C, at the same time filling the dribble trough 134. As the amount of substance in the tray C increases, the first beam 18 will tend more and more to pivot in a counterclockwise direction, and when the weight of the substance in the tray C approaches the predetermined weight, as determined by the positioning of the adjustable balancing weight 62, the first beam 18 will pivot sufficiently to disengage the contacts 70 and 72. This will cause the bulk relay contact 204 to move away from the contact 206, thus opening the circuit to the electromagnet 130 and stopping the bulk feed. At the same time the contact 204 will engage the contact 216 and, hence, a circuit will be closed from one end of the line 208 through the contacts 204 and 216 to the constant speed motor 176 and from there to contact 218 in the dribble electronic relay 220. Since at this point the second weighing beam 80 will be pivoted in a clockwise direction so as to cause the contacts 88 and 89 to engage, the contact 218 in the dribble electronic relay 220 will be engaged with contact 222, a circuit being defined therethrough to the other end 214 of the line. Consequently, the timing motor 176 will commence to rotate, thus rotating shaft 178 and with it cams 182 and 184. Note that the first beam 18 remains stationary, pivoted in its clockwise direction, during the bulk feed and up until the very moment when that bulk feed is to be stopped.

Cam 182 controls the dribble feed. A circuit may be traced from one end 208 of the line through the electromagnet 144 which is active upon the dribble feed trough 134, and then through rectifier 224 to the stationary leaf contact 196 in leaf switch 190 associated with the cam 182. When that cam is in the position shown in Fig. 4, in which its raised surface 186 is in contact with the cam engaging portion 200 of the flexible leaf 198, the two leaves will be engaged as shown, and, hence, the circuit may be traced from the leaf 196 to the leaf 198 and through the adjustment rheostat 226 and the contacts 218 and 222 to the other side of the line 214. Hence, the electromagnet 144 will be supplied with pulsating current, the dribble feed trough 134 will be vibrated, and feed from that trough into the tray C will take place. As the motor 176 rotates, the cam 182 will rotate until its depressed surface 188 will come opposite the cam engaging portion 200 of the flexible leaf 198. When this occurs (see Fig. 7), the circuit to the electromagnet 144 will be opened and, hence, the dribble feed will stop. Accordingly, it will be apparent that the dribble feed will be actuated in an intermittent manner as determined by the shape of the cam 182. As here disclosed, the raised surface 186 and the depressed surface 188 thereof are substantially equal in angular extent so that the dribble feed will be actuated half of the time and will not be actuated half of the time. Of course, it is to be understood that this time relationship, and others set forth herein, are by way of exemplification only.

A second circuit can be traced from one end 208 of the line via leads 228 and 230 to the flexible leaf 198 of the other leaf switch 192, the one controlled by the cam 184. The stationary leaf 196 of this leaf switch is connected to one end of the solenoid 104, the other end being connected via lead 232 to contact 218 in the dribble electronic relay 220 and from there via contact 222 to the other end 214 of the line. Consequently, whenever the leaves 196 and 198 of this second leaf switch 192 engage, a circuit will be closed through the solenoid 104, energizing it and causing the rod 100 to be pulled down, thus removing the upper collar 110 thereof from under the first member 90 and permitting the weight of that member to be exerted on the second beam 80 so as to retain that beam in its position pivoted clockwise as viewed in Fig. 3, keeping the contacts 88 and 89 engaged so as to energize the dribble electronic relay 220 and thus maintain the contacts 218 and 222 in engagement. An examination of Figs. 4 and 7 will disclose that on cam 184 the raised surface 186a is considerably greater in angular extent than the raised surface 186 on the cam 182, and that the depressed surface 188a thereon is correspondingly of considerably less angular extent than is the surface 188 on cam 182. When the cam engaging portion 200 of the flexible leaf 198 is engaged with the raised surface 186a, the solenoid 104 will be energized and, hence, the restraining means F will be actuated so as to counterbalance the second beam 80 and prevent it from performing its weighing function. It will be clear, therefore, that the time during which the second beam 80 can perform its weighing function is considerably less than the interval during which the dribble feed trough 134 is not actuated. The cams 182 and 184 are so angularly positioned relative to one another that the restraining means F will be actuated during the entire period that the dribble feed electromagnet 144 is energized and during an interval immediately thereafter when the dribble feed electromagnet 144 is not energized. The duration of this period is carefully calculated to take into account the time of transit or falling of the substance from the end 136 of the dribble feed trough 134 to the tray C. It is only after all of the material which has been fed by the dribble feed trough 134 during its interval of operation has fallen to the tray C, and has become stationary, that the depressed surface 188a of the cam 184 comes opposite the cam engaging portion 200 of the leaf 198, thus permitting the circuit to the solenoid 104 to be opened, de-actuating the restraining means F and permitting the spring 108 to move the rod 100 upwardly and lift the first member 90 from the second beam 80. By way of example, it has been found desirable, when using this machine for delivering predetermined weights of lumpy material, to have the dribble feed actuated for .3 second, during which period the solenoid 104 is energized, to retain the solenoid 104 energized for .15 second thereafter, to de-energize the solenoid 104 and permit the scale to perform its weighing function for .15 second, and then to re-energize the solenoid 104 and resume the dribble feed.

This permits the second beam 80 to perform its weighing function, which it does as follows: As more and more of the substance is fed into the tray C, the first beam 18, which previously has pivoted in a counterclockwise direction only enough to separate the contacts 70 and 72, will pivot even further in that direction and eventually (at a time determined by the clearance between the rod 84 and arm 86) the arm 86 will engage and press upon the rod 84, thus tending to cause the second beam 80 to itself pivot in a counterclockwise direction when it is permitted so to do by the removal of the first member 90 therefrom. It will be noted that the second beam 80 normally tends to pivot in a clockwise direction since more of its length is to the right of its pivot point than to the left as viewed in Figs. 2 and 3, the second beam 80 being adjustably balanced by positioning the weight 91.

The timing motor 176 will continue to rotate and, hence, the dribble feed will continue, will stop, a predetermined interval will pass, the second beam 80 will be released for weighing action, it will once again be restrained, and the dribble feed will resume until the time comes when the weight of the substance in the tray C, as accurately measured by the second beam 80 after all of the material fed on the last pulse of the dribble feed has fallen into the tray C and become stationary, will reach the predetermined amount. The scale B will be set to accommodate that predetermined amount by appropriate positioning of the weight 62 along the rod 58 and of the weight 91 along the second beam 80. When this occurs, the first beam 18 will have sufficient force applied thereto via the mechanical connection defined by the arm 86 and the rod 84 so that it will pivot counterclockwise and separate the contacts 88 and 89, thus opening the dribble electronic relay 220. When this occurs, the contact 222 will move away from the contact 218, thus opening the circuit through the timing motor 176, the solenoid 104, and the dribble feed electromagnet 144, thereby stopping the dribble feed and preventing any additional substance from being fed into the tray. The contact 222 will engage contact 234 so that a circuit will then be defined from one end 208 of the line through foot switch 236, solenoid 164, and the contacts 234 and 222 to the other end 214 of the line. This will energize solenoid 164 and thus trip the tray C from its position shown in solid lines in Fig. 1 to its dispensing position shown in broken lines therein, thus causing the contents of the tray C to fall over the dispensing lip 32 thereof into the container 146. The purpose of the foot switch 236 is to prevent this dispensing action unless the operator has positioned a container 146 in position below the funnel 42. Instead of a foot switch, an interlock switch could be provided, automatically actuated whenever a container 146 is placed in position. It will be noted that, as was the case with the first beam 18, the second beam 80 remains stationary until the very moment that the weight of the substance in the tray C reaches the predetermined amount.

As soon as the tray C has relieved itself of its contents, the counterbalancing weight 42 will once again pivot the first beam 18 in a clockwise direction as viewed in Fig. 3 so as to close the contacts 70 and 72. At the same time, the pressure imparted to the rod 84 by the arm 86 will be relieved and the second beam 80 will pivot in a clockwise direction so as to engage contacts 88 and 89, thus closing the dribble electronic relay 220. The contacts will, therefore, be in the position they were at the beginning of the sequence just described, the circuit through the electromagnet 164 will be opened, the spring 168 will cause the tray C to resume its position shown in solid lines in Fig. 1, and the bulk feed electromagnet 130 will again be energized with pulsating current, thus starting the sequence again. If necessary, a time delay may be incorporated in the circuits to the bulk and dribble feeds to prevent them from functioning until the tray C has resumed its horizontal position.

It should be particularly noted that whenever the solenoid 104 is actuated, the counterbalancing effect of the first member 90 on the second beam 80 is such as to positively hold that beam in stationary position, the contact 88 being pressed against the contact 89, thus positively preventing any oscillatory condition from developing during the feeding interval which might give rise to inaccurate weighing.

The advantages of the mode of operation here disclosed will in the main be fully apparent from the above. That mode of operation has been disclosed in its specific form involving a non-intermittent bulk feed which continues until the weight of the substance in the tray C approaches its predetermined amount, after which the dribble feed takes over, is actuated intermittently, and the scale is restrained from its weighing function during the dribble feeding pulses and preferably for a predetermined interval thereafter in order to permit all of the fed material to fall into the tray C and become stationary. The method, of course, may be more broadly applied to a single type of feed which is intermittently actuated throughout, and the dribble feed, if desired, could be actuated along with the bulk feed when the bulk feed is actuated. Other variations will suggest themselves, all within the purview of the present invention. By means of this mode of operation, the substance in the tray C is weighed—that is to say, the scale is conditioned so that its controls may be actuated—only after the system has become static. The momentum effects of the substance being fed and the effects of substance in transit are completely and efficaciously eliminated. Best results are obtained when the scale is positively held stationary during the time that it is restrained from performing the weighing function so that even the relatively minor inaccuracies which might be caused by a vibratory condition in the scale will not be present. As a result, a predetermined amount of substance may be weighed and dispensed in a fully automatic manner and with a degree of accuracy far in excess of many which have heretofore been obtainable.

The apparatus here disclosed permits the carrying out in a very simple manner of the mode of operation above described, in particular, by employing a pair of weighing beams, each controlling specific functions of the apparatus, by so constructing the apparatus that the beams are stationary until the very moment that the weight of the substance in the tray C causes them to actuate the control operatively connected thereto, and by providing the specific restraining means here disclosed which includes a lost motion connection between the actuating electromagnet 104 and the second beam 80.

It will be apparent that many variations may be made in the specific disclosure here set forth, without departing from the spirit of the invention as defined in the following claims.

I claim:

1. A weighing machine comprising a stationary weight sensing element, a tray or the like operatively connected thereto, a single means for feeding a continuous stream of substance into said tray, a timer operatively connected to said feeding means for actuating said feeding means in an intermittent fashion so that said stream is interrupted and re-established a plurality of times during each cycle of operation according to a predetermined time schedule, a control operatively connected to said feeding means and effective when actuated to stop said feeding means, an operative connection between said control and said weight sensing element effective when the weight of said tray and its contents reaches a predetermined value to actuate said control, a restraining element operatively connected to said weight sensing element and effective when actuated to hold said weight sensing element stationary in a position such that said control will not be actuated, and an operative connection between said timer and said restraining element effective to actuate said restraining element during the entire period when said feeding means is actuated and to release said restraining element at some time during the period that said feeding means is not actuated.

2. The weighing machine of claim 1, in which said restraining means comprises a first member movable to a position active on said weight sensing element so as to counterbalance it against the weight of said tray and its contents, a second member operatively connected to said first member and normally spring urged to a position such that said first member is not thus active on said weight sensing element, and an actuating mechanism operatively connected to said second member and to said timer effective when actuated to move said second member from its normal position, said first member being thereby rendered active on said weight sensing element.

3. The weighing machine of claim 2, in which said first member is urged with a substantially constant force into engagement with said weight sensing element, and in which said second member has a lost motion connection to said first member such that when said second member is in its normal position it engages said first member and moves it out of engagement with said weight sensing element, and when said second member is moved from its normal position said first member is permitted to engage said weight sensing element.

4. The weighing machine of claim 1, in which said restraining means comprises an arm suspended above said weight sensing element and movable by its own weight into engagement with said weight sensing element so as to counterbalance it against the weight of the tray and its contents, a member normally spring urged into engagement with said arm so as to lift said arm out of engagement with said weight sensing element, and an electromagnet operatively connected to said member and to said timer effective when energized to move said member from its normal position, said arm being thereby rendered active on said weight sensing element.

5. The weighing machine of claim 4, in which said spring urged member has a lost motion connection to said arm such that when said spring urged member is in its normal position, it engages said arm and moves it out of engagement with said weight sensing element, and when said spring urged member is moved from its normal position said arm is permitted to freely engage said weight sensing element.

6. The weighing machine of claim 1, in which said timer comprises a pair of rotary cams simultaneously rotated by a motor, one of said cams having a cam surface of given angular extent effective to actuate said feeding means, the other of said cams having a cam surface of greater angular extent effective to actuate said restraining element, said cams being so angularly related that said restraining element is actuated during the entire period when said feeding means is actuated, said restraining element being released at some time during the period that said feeding means is not actuated.

7. A weighing machine comprising first and second weighing beams, a tray or the like connected to said first weighing beam, means for feeding a substance into said tray, said first beam being movable to a first position when the weight of said tray and its contents approach a predetermined value, said first beam in said first position engaging said second beam, said second beam being then movable to a second position when the weight of said tray and its contents reach said predetermined value, a restraining element operatively connected to said second beam and effective when actuated to hold said second beam out of said second position, a timer operatively connected to said feeding means so as to actuate it intermittently and operatively connected to said restraining element so as to actuate it during the entire period when said feeding means is actuated and to release it at some time during the period that said feeding means is not actuated, a control operatively connected to said timer and said first beam and effective when said first beam is in said first position to actuate said timer, and a control operatively connected to said feeding means and to said second beam and effective when said second beam is in said second position to terminate the action of said feeding means.

8. The weighing machine of claim 7, in which said timer comprises a pair of rotary cams simultaneously rotated by a motor, one of said cams having a cam surface of given angular extent effective to actuate said feeding means, the other of said cams having a cam surface of greater angular extent effective to actuate said restraining element, said cams being so angularly related that said restraining element is actuated during the entire period when said feeding means is actuated, said restraining element being released at some time during the period that said feeding means is not actuated.

9. The weighing machine of claim 8, in which said motor is electrically connected to a source of power via a switch, and in which said switch is operatively connected to and actuated by said first beam so as to be closed when said first beam assumes its first position.

10. A weighing machine comprising first and second weighing beams, a tray or the like connected to said first weighing beam, bulk feed means and dribble feed means for feeding a substance into said tray, said first beam being movable to a first position when the weight of said tray and its contents approach a predetermined value, said first beam in said first position engaging said second beam, said second beam being then movable to a second position when the weight of said tray and its contents reach said predetermined value, a restraining element operatively connected to said second beam and effective when actuated to hold said second beam out of said second position, a bulk feed control operatively connected to said bulk feed means and to said first beam and operable only when said first beam is in a position other than said first position to actuate said bulk feed means, a timer operatively connected to said dribble feed means so as to actuate it intermittently and operatively connected to said restraining element so as to actuate it during the entire period when said dribble feed means is actuated and to release it at some time during the period that said dribble feed means is not actuated, a control operatively connected to said timer and said first beam and effective when said first beam is in said first position to actuate said timer, and a control operatively connected to said dribble feed means and to said second beam and effective when said second beam is in said second position to terminate the action of said dribble feed means.

11. The weighing machine of claim 10, in which said timer comprises a pair of rotary cams simultaneously rotated by a motor, one of said cams having a cam surface of given angular extent effective to actuate said feeding means, the other of said cams having a cam surface of greater angular extent effective to actuate said restraining element, said cams being so angularly related that said restraining element is actuated during the entire period when said feeding means is actuated, said restraining element being released at some time during the period that said feeding means is not actuated.

12. The weighing machine of claim 11, in which said motor is electrically connected to a source of power via a switch, and in which said switch is operatively connected to and actuated by said first beam so as to be closed when said first beam assumes its first position.

13. In a weighing machine comprising a tray, means for feeding a continuous stream of material into said tray for an appreciable period of time on the order of several seconds, means for weighing the amount of material in said tray and means for restraining said weighing means; an actuating system comprising first means for intermittently energizing and de-energizing said feeding means a plurality of times during each weighing cycle so that said stream is interrupted according to a predetermined time schedule, second means for intermittently energizing said restraining means, and timed means controlling said two energizing means and actuating said second energizing means whenever it actuates said first energizing means during each cycle of operation.

14. In a weighing machine comprising a tray, means for causing a continuous stream of material to fall into said tray for an appreciable period of time on the order of several seconds, means for weighing the amount of material in said tray and means for restraining said weighing means; an actuating system comprising first means for intermittently energizing and de-energizing said feeding means a plurality of times during each weighing cycle so that said stream is interrupted according to a predetermined time schedule, second means for intermittently energizing said restraining means, and timed means controlling said two energizing means and actuating said second energizing means whenever it actuates said first energizing means and for a predetermined period of time thereafter during each cycle of operation, said predetermined period being related to and no less than the length of time it takes for said material to fall from said feeding means to said tray.

15. In a weighing machine comprising a tray, means for feeding a continuous stream of material into said tray for an appreciable period of time on the order of several seconds, means for weighing the amount of material in said tray and means for restraining said weighing means; an actuating system comprising first means for intermittently energizing and de-energizing said feeding means a plurality of times during each weighing cycle so that said stream is interrupted according to a predetermined time schedule having a period on the order of ½ second, second means for intermittently energizing said restraining means, and timed means controlling said two energizing means and actuating said second energizing means whenever it actuates said first energizing means during each cycle of operation.

16. In a weighing machine comprising a tray, means for causing a continuous stream of material to fall into said tray for an appreciable period of time on the order of several seconds, means for weighing the amount of material in said tray and means for restraining said weighing means; an actuating system comprising first means for intermittently energizing and de-energizing said feeding means a plurality of times during each weighing cycle so that said stream is interrupted according to a predetermined time schedule having a period on the order of ½ second, second means for intermittently energizing said restraining means, and timed means controlling said two energizing means and actuating said second energizing means whenever it actuates said first energizing means and for a predetermined period of time thereafter during each cycle of operation, said predetermined period being related to and no less than the length of time it takes for said material to fall from said feeding means to said tray.

17. In a weighing machine comprising a tray, coarse means for feeding material into said tray at a given rate, fine means for feeding a continuous stream of material into said tray at a slower rate for an appreciable period of time on the order of several seconds, means for sensing the weight of material in said tray, and means for restraining said sensing means; an actuating system comprising means controlled by said sensing means for disabling said coarse feeding means when the weight of material in said tray reaches a predetermined value, first means for thereafter intermittently energizing said fine feeding means so that said stream is interrupted according to a predetermined time schedule, second means for intermittently energizing said means for restraining said sensing means, and timed means controlling said two energizing means and active to insure that said second energizing means is actuated whenever said first energizing means is actuated during each cycle of operation.

18. In the weighing machine of claim 17, means controlled by said sensing means for energizing said timing means when the weight of the material in said tray reaches a predetermined value.

19. The weighing machine of claim 18, in which said fine feeding means is de-energized except when said timing means is actuated.

20. In a weighing machine comprising a tray, coarse means for feeding material into said tray at a given rate, fine means for causing a continuous stream of material to fall into said tray at a slower rate for an appreciable period of time on the order of several seconds, means for sensing the weight of material in said tray, and means for restraining said sensing means; an actuating system comprising means controlled by said sensing means for disabling said coarse feeding means when the weight of material in said tray reaches a predetermined value, first means for thereafter intermittently energizing said fine feeding means so that said stream is interrupted according to a predetermined time schedule, second means for intermittently energizing said means for restraining said sensing means, and timed means controlling said two energizing means and active to insure that said second energizing means is actuated whenever said first energizing means is actuated and for a predetermined period of time thereafter during each cycle of operation, said predetermined period being related to and no less than the length of time it takes for said material to fall from said feeding means to said tray.

21. In the weighing machine of claim 20, means controlled by said sensing means for energizing said timing means when the weight of the material in said tray reaches a predetermined value.

22. The weighing machine of claim 21, in which said fine feeding means is de-energized except when said timing means is actuated.

23. In a weighing machine comprising a tray, coarse means for feeding material into said tray at a given rate, fine means for feeding a continuous stream of material to fall into said tray at a slower rate for an appreciable period of time on the order of several seconds, means for sensing the weight of material in said tray, and means for restraining said sensing means; an actuating system comprising means controlled by said sensing means for disabling said coarse feeding means when the weight of material in said tray reaches a predetermined value, first means for thereafter intermittently energizing said fine feeding means so that said stream is interrupted according to a predetermined time schedule having a period on the order of ½ second, second means for intermittently energizing said restraining means, and timed means controlling said two energizing means and active to insure that said second energizing means is actuated whenever said first energizing means is actuated during each cycle of operation.

24. In the weighing machine of claim 23, means controlled by said sensing means for energizing said timing means when the weight of the material in said tray reaches a predetermined value.

25. The weighing machine of claim 24, in which said fine feeding means is de-energized except when said timing means is actuated.

26. In a weighing machine comprising a tray, coarse means for feeding material into said tray at a given rate, fine means for causing a continuous stream of material to fall into said tray at a slower rate for an appreciable period of time on the order of several seconds, means for sensing the weight of material in said tray, and means for restraining said sensing means; an actuating system comprising means controlled by said sensing means for disabling said coarse feeding means when the weight of material in said tray reaches a predetermined value, first means for thereafter intermittently energizing said fine feeding means so that said stream is interrupted according to a predetermined time schedule having a period on the order of ½ second, second means for intermittently energizing said restraining means, and timed means controlling said two energizing means and active to insure that said second energizing means is actuated whenever said first energizing means is actuated and for a predetermined period of time thereafter during each cycle of operation, said predetermined period being related to and no less than the length of time it takes for said material to fall from said feeding means to said tray.

27. In the weighing machine of claim 26, means controlled by said sensing means for energizing said timing means when the weight of the material in said tray reaches a predetermined value.

28. The weighing machine of claim 27, in which said fine feeding means is de-energized except when said timing means is actuated.

29. A weighing machine comprising a stationary weight sensing element, a tray or the like operatively connected thereto, a single means for feeding a continuous stream of substance into said tray, a timer operatively connected to said feeding means for actuating said feeding means, a control operatively connected to said feeding means and effective when actuated to stop said feeding means, an operative connection between said control and said weight sensing element effective when the weight of said tray and its contents reach a predetermined value to actuate said control, a restraining element operatively connected to said weight sensing element and effective when actuated to hold said weight sensing element stationary in a position such that said control will not be actuated, and an operative connection between said timer and said restraining element effective to actuate said restraining element during the entire period when said feeding means is actuated and to release said restraining element at some time during the period that said feeding means is not actuated, said restraining means comprising a first member movable to a position active on said weight sensing element so as to counterbalance it against the weight of said tray and its contents, a second member operatively connected to said first member and normally spring urged to a position such that said first member is not thus active on said weight sensing element and an actuating mechanism operatively connected to said second member and to said timer effective when actuated to move said second member from its normal position, said first member being thereby rendered active on said weight sensing element.

30. The weighing machine of claim 29, in which said first member is urged with a substantially constant force into engagement with said weight sensing element and in which said second member has a lost motion connection to said first member such that when said second member is in its normal position it engages said first member and moves it out of engagement with said weight sensing element, and when said second member is moved from its normal position said first member is permitted to engage said weight sensing element.

31. A weighing machine comprising a stationary weight sensing element, a tray or the like operatively connected thereto, a single means for feeding a continuous stream of substance into said tray, a timer operatively connected to said feeding means for actuating said feeding means, a control operatively connected to said feeding means and effective when actuated to stop said feeding means, an operative connection between said control and said weight sensing element effective when the weight of said tray and its contents reach a predetermined value to actuate said control, a restraining element operatively connected to said weight sensing element and effective when actuated to hold said weight sensing element stationary in a position such that said control will not be actuated, and an operative connection between said timer and said restraining element effective to actuate said restraining element during the entire period when said feeding means is actuated and to release said restraining element at some time during the period that said feeding means is not actuated, said restraining means comprising an arm suspended above said weight sensing element and movable by its own weight into engagement with said weight sensing element so as to counterbalance it against the weight of the tray and its contents, a member normally spring urged into engagement with said arm so as to lift said arm out of engagement with said weight sensing element and an electromagnet operatively connected to said member and to said timer effective when energized to move said member from its normal position, said arm being thereby rendered active on said weight sensing element.

32. The weighing machine of claim 31, in which said spring urged member has a lost motion connection to said arm such that when said spring urged member is in its normal position, it engages said arm and moves it out of engagement with said weight sensing element, and when said spring urged member is moved from its normal position said arm is permitted to freely engage said weight sensing element.

References Cited in the file of this patent

UNITED STATES PATENTS

| 748,055 | Driver | Dec. 29, 1903 |
| 948,289 | Cromley | Feb. 1, 1910 |
| 1,713,575 | Warwick | May 21, 1929 |
| 1,816,153 | Knight | July 28, 1931 |
| 1,986,268 | Hughes | Jan. 1, 1935 |
| 2,058,775 | Cundall | Oct. 27, 1936 |
| 2,151,107 | Howard | Mar. 21, 1939 |
| 2,198,788 | Popov | Apr. 30, 1940 |
| 2,207,885 | Howard | July 16, 1940 |
| 2,387,894 | Fannin | Oct. 30, 1945 |

FOREIGN PATENTS

| 271,498 | Great Britain | 1927 |
| 431,805 | Great Britain | 1935 |
| 492,634 | Great Britain | 1938 |